(12) United States Patent
Hartwich et al.

(10) Patent No.: US 9,852,106 B2
(45) Date of Patent: *Dec. 26, 2017

(54) METHOD AND DEVICE FOR SERIAL DATA TRANSMISSION HAVING A FLEXIBLE MESSAGE SIZE AND A VARIABLE BIT LENGTH

(75) Inventors: Florian Hartwich, Reutlingen (DE); Christian Horst, Dusslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 756 days.

This patent is subject to a terminal disclaimer.

(21) Appl. No.: 14/129,611

(22) PCT Filed: Jun. 26, 2012

(86) PCT No.: PCT/EP2012/062364
§ 371 (c)(1),
(2), (4) Date: Mar. 25, 2014

(87) PCT Pub. No.: WO2013/000916
PCT Pub. Date: Jan. 3, 2013

(65) Prior Publication Data
US 2014/0258571 A1  Sep. 11, 2014

(51) Int. Cl.
*G06F 13/42* (2006.01)
*H04L 12/40* (2006.01)
(Continued)

(52) U.S. Cl.
CPC ...... *G06F 13/4295* (2013.01); *G06F 13/4282* (2013.01); *H04L 1/0083* (2013.01);
(Continued)

(58) Field of Classification Search
CPC .................... H04L 2012/40215; H04L 1/0083
See application file for complete search history.

(56) References Cited

U.S. PATENT DOCUMENTS 5,469,150 A * 11/1995 Sitte ..................... G05B 19/054
340/3.1
8,324,868 B2  12/2012 Choi et al.
(Continued)

FOREIGN PATENT DOCUMENTS

CN   1860742 A   11/2006
CN   101018179 A   8/2007
(Continued)

OTHER PUBLICATIONS

Vieweg, F., et al, "Bosch Kraftfahrtechnisches Handbuch" [Bosch motor vehicle technology manual], 27th Edition, 2011, pp. 852-862, 1074-1084 and 1086-1119.
(Continued)

*Primary Examiner* — Zachary K Huson
(74) *Attorney, Agent, or Firm* — Norton Rose Fulbright US LLP; Gerard Messina

(57) ABSTRACT

A method for serial data transfer in a bus system having at least two bus subscribers that exchange messages via the bus, the transmitted messages having a logical structure according to CAN standard ISO 11898-1, the logical structure encompassing a start of frame bit, arbitration field, control field, data field, CRC field, acknowledge field, and end of frame sequence, the control field encompassing a data length code that contains an information item regarding the length of the data field. The method is characterized in that when a first marker (EDL) is present, the control field of the messages, divergently from ISO 11898-1, encompasses more than six bits; the first marker (EDL) being implemented by way of a recessive bit in the control field, and when the first marker is present, the recessive bit of the first marker (EDL) being followed, in all data messages, by at least one dominant bit.

21 Claims, 5 Drawing Sheets

(51) Int. Cl.
*H04L 1/00* (2006.01)
*H04L 12/805* (2013.01)

(52) U.S. Cl.
CPC ........ *H04L 12/40169* (2013.01); *H04L 47/36* (2013.01); *H04L 2001/0094* (2013.01); *H04L 2012/40215* (2013.01)

(56) References Cited

U.S. PATENT DOCUMENTS

| | | | |
|---|---|---|---|
| 8,448,035 | B2 | 5/2013 | Yamamoto et al. |
| 8,509,257 | B2 | 8/2013 | Yakashiro |
| 9,091,551 | B2 | 7/2015 | Hannah et al. |
| 2007/0091832 | A1 | 4/2007 | Lee |
| 2007/0091932 | A1 | 4/2007 | Hwang |
| 2007/0189323 | A1 | 8/2007 | Swoboda et al. |
| 2009/0206798 | A1 | 8/2009 | Choi et al. |
| 2009/0322492 | A1 | 12/2009 | Hannah et al. |
| 2010/0131816 | A1 | 5/2010 | Yamamoto et al. |
| 2010/0150176 | A1* | 6/2010 | Yakashiro ......... H04L 12/40006 370/475 |
| 2010/0158045 | A1* | 6/2010 | Shin ................. H04L 12/40071 370/473 |

FOREIGN PATENT DOCUMENTS

| | | |
|---|---|---|
| CN | 101814230 A | 8/2010 |
| CN | 101873299 A | 10/2010 |
| DE | 103 11 395 | 9/2004 |
| DE | 10 2004 055 684 A1 | 5/2006 |
| DE | 10 2007 051657 | 4/2009 |
| JP | 2001339412 A | 12/2001 |
| JP | 2010258990 A | 11/2010 |
| JP | 2010272971 A | 12/2010 |
| RU | 2 364 040 C2 | 8/2009 |
| TW | 200941974 A | 10/2009 |
| WO | 2013000916 A1 | 1/2013 |

OTHER PUBLICATIONS

Vieweg+Teubner, "Bosch Kraftfahrtechnisches Handbuch" [Bosch motor vehicle technology manual], 27th edition, 2011.
G. Cena and A. Valenzano, "Overclocking of controller area networks", Electronics Letters, vol. 35, No. 22 (1999), p. 1924.
ISO 11898-1, First Edition Dec. 1, 2003.
Bosch CAN Specification, Version 2.0, 1991.

* cited by examiner

Standard Format CAN

Extended Format CAN

SOF = Start Of Frame
RTR = Remote Transmission Request
SRR = Substitute Remote Request
IDE = Identifier Extension Bit Standard Format CAN FD Long Extended Format CAN FD Long

| DLC | STANDARD CAN | DLC 1 | DLC 2 | DLC 3 |
|---|---|---|---|---|
| 0000 | 0 (not used) | 0 (not used) | 16 | 0 |
| 0001 | 1 | 1 | 1 | 1 |
| 0010 | 2 | 2 | 2 | 2 |
| 0011 | 3 | 3 | 3 | 3 |
| 0100 | 4 | 4 | 4 | 4 |
| 0101 | 5 | 5 | 5 | 5 |
| 0110 | 6 | 6 | 6 | 6 |
| 0111 | 7 | 7 | 7 | 7 |
| 1000 | 8 | 8 | 8 | 8 |
| 1001 | 8 | 9 | 9 | 12 |
| 1010 | 8 | 10 | 10 | 16 |
| 1011 | 8 | 11 | 11 | 20 |
| 1100 | 8 | 12 | 12 | 24 |
| 1101 | 8 | 13 | 13 | 32 |
| 1110 | 8 | 14 | 14 | 48 |
| 1111 | 8 | 15 | 15 | 64 |

Fig. 2

Standard Format CAN FD Fast

Extended Format CAN FD Fast

METHOD AND DEVICE FOR SERIAL DATA TRANSMISSION HAVING A FLEXIBLE MESSAGE SIZE AND A VARIABLE BIT LENGTH

FIELD OF THE INVENTION

The present invention relates to a method and to an apparatus, for example a communication controller, for serial data transfer between at least two subscribers in a serial bus system.

BACKGROUND INFORMATION

The Controller Area Network (CAN), as well as an extension of CAN referred to as "time triggered CAN" (TTCAN), are known, for example, from standards of the ISO 11898-1 to -5 family; these are also referred to hereinafter as "standard CAN." The media access control method used in CAN is based on bitwise arbitration. In bitwise arbitration, several subscriber stations can simultaneously transfer data via the channel of the bus system without thereby disrupting data transfer. The subscriber stations can furthermore, upon transmission of a bit via the channel, ascertain the logical state (0 or 1) of the channel. If a value of the transmitted bit does not correspond to the ascertained logical state of the channel, the subscriber station then terminates access to the channel. With CAN, bitwise arbitration is usually performed on the basis of an identifier within a message to be transferred via the channel. Once a subscriber station has completely transmitted the identifier onto the channel, it knows that it has exclusive access to the channel. The end of the transfer of the identifier thus corresponds to a beginning of an authorization interval within which the subscriber station can exclusively use the channel. According to the CAN protocol specification, other subscriber stations are not allowed to access the channel, i.e. transmit data onto the channel, until the transmitting subscriber station has transferred a checksum field (CRC field) of the message. A point in time at which transfer of the CRC field ends thus corresponds to an end of the authorization interval.

Bitwise arbitration thus results in nondestructive transfer, via the channel, of that message which has won the arbitration method. The CAN protocols are particularly suitable for transferring short messages under real-time conditions; by appropriate allocation of the identifier, it is possible to ensure that particularly important messages almost always win the arbitration and are sent successfully.

The increasing networking of modern vehicles and the inclusion of additional systems to improve, for example, driving safety or driving convenience, is accompanied by rising demands in terms of the data volumes to be transferred and the latency times permissible in the context of transfer. Examples are vehicle dynamics control systems such as the electronic stability program (ESP), driver assistance systems such as automatic cruise control (ACC), or driver information systems such as traffic sign detection (see, for example, descriptions in "Bosch Kraftfahrtechnisches Handbuch" (Bosch motor vehicle technology manual), 27th edition, 2011, Vieweg+Teubner).

German Patent Document DE 103 11 395 A1 discusses a system in which asynchronous serial communication can occur alternatively via an asymmetrical physical CAN protocol or via the symmetrical physical CAN protocol, and a higher data transfer rate or data transfer security for asynchronous communication is thereby achievable.

German Patent Document DE 10 2007 051 657 A1 discusses using an asynchronous, fast, non-CAN-conforming data transfer in the exclusive time windows of the TTCAN protocol in order to increase the transferred data volume.

In "Overclocking of controller area networks" (Electronics Letters, Vol. 35, No. 22 (1999), p. 1924), G. Cena and A. Valenzano discuss the effects of overclocking the bus frequency in sub-regions of messages to the data rate that is effectively achieved.

It is apparent that the existing art does not provide results that are satisfactory in every regard.

SUMMARY OF THE INVENTION

The invention, with its advantages, is described below with reference to drawings and to exemplifying embodiments. The subject matter of the invention is not limited to the exemplifying embodiments that are depicted and discussed.

The present invention makes available a method for serial data transfer in a bus system having at least two bus subscribers that exchange messages via the bus, the transmitted messages having a logical structure in accordance with the CAN standard ISO 11898-1. In other words, data-transferring messages are constructed from a single leading "start of frame" bit and a sequence of fields made up of multiple bits, namely an arbitration field, control field, data field, CRC field, acknowledge field, and end of frame field.

The method is notable for the fact that when a first marker is present, the control field of the messages, divergently from the CAN standard ISO 11898-1, encompasses more than six bits; the first marker (EDL) is implemented by way of a recessive bit in the control field, and when the first marker is present, the recessive bit of the first marker (EDL) is followed, in all data messages, by at least one dominant bit (r0, r1). The recessive-dominant edge that is created by the dominant bit (r0, r1) that follows the recessive bit of the first marker (EDL) in all data messages may be utilized to improve synchronization between the bus subscribers. It is particularly advantageous in this context if a hard synchronization is carried out by the bus subscribers at the relevant recessive-dominant edge. The edge, and the synchronization actions of the bus subscribers carried out thereat, effectively prevent the occurrence of communication errors that could be produced in the event of loss of synchronization of the bus subscribers.

In an exemplary embodiment, when the first marker is present, the data field of the messages, divergently from the CAN standard ISO 11898-1, can encompass more than eight bytes, the values of the four bits of the data length code being interpreted at least in part divergently from the CAN standard ISO 11898-1 in order to establish the size of the data field. In a particular embodiment, when a second marker is present, the bit length for at least one predefined or predefinable region within the message assumes a value that is shortened with respect to the bit length used before the second marker was present, the region beginning at the earliest with the second marker and ending at the latest with the CRC delimiter; the second marker occurs only when the first marker is present and occurs in the control field of the messages which, divergently from the CAN standard ISO 11898-1, encompasses more than six bits. This has the advantage, as compared with the method known from the existing art, that as a result of the two-step switchover (the size of the data field on the one hand, and the bit length in parts of the message on the other hand) with a separate marker in each case, the advantages of the two features can also be utilized separately to the extent possible. For example, even if the switchover to a shorter bit length is not possible for reasons of bus topology, messages having a higher data volume can continue to be sent. In addition, upon the occurrence of errors in messages having a shortened bit length, a switchover can firstly occur to the normal bit length without sacrificing the advantages of enlarging the data region.

It is particularly advantageous that the first marker (EDL) is implemented by way of a recessive bit in the control field, since there are bits available therein which are always sent in dominant fashion in standard-compliant CAN messages. In addition, the edge between the recessive marker and a subsequent dominant bit can be used for synchronization purposes if, as is provided in an advantageous embodiment, the recessive bit of the first marker (EDL) is followed, in all data messages, by at least one dominant bit.

It is furthermore advantageous, for marker and synchronization purposes, if the second marker (BRS) is likewise implemented by way of a recessive bit in the control field which is transferred later in time than the bit of the first marker (EDL), especially when it is separated from the recessive bit of the first marker by at least one dominant bit.

When the first marker is present, advantageously the edge between the recessive bit of the first marker and the at least one subsequent dominant bit can be used for resynchronization or hard synchronization of the bit timing of the bus subscribers, which increases data transfer reliability and fault tolerance in particular in the context of a subsequent switchover in bit length.

It is furthermore advantageous if, as a function of a value of the first switchover condition, each of the possible value combinations of the four bits of the data length code is associated with one of the permissible sizes of the data field. This creates a transparent and flexible capability for using numerous different data field sizes.

The first marker is advantageously evaluated in the bus subscribers and, as a function of the first marker, the receiving process is adapted to the size of the control field and/or of the data field and/or of the subsequent constituents of the message, in particular of the CRC field. The second marker is also evaluated in the bus subscribers when the first marker is present, and as a function of the value of the second marker, the receiving process is adapted to the different values of the bit length within a message. The high probability of detecting transfer errors that is a notable feature of the CAN bus is thereby retained, since all the bus subscribers can, as a function of the marker, check for conformity with protocol specifications.

In a manner that is advantageous because it minimizes implementation outlay, the at least two different values of the time-related bit length within a message are realized by using at least two different scaling factors to adjust the bus time unit during operation relative to a shortest time unit or to the oscillator clock.

When a further marker, which can match the first marker (EDL), is present, in an advantageous manifestation the CRC field of the messages has a number of bits divergent from the CAN standard ISO 11898-1, and/or at least one generator polynomial divergent from the CAN standard ISO 11898-1 is used, so that the desired fault detection probability is achieved even when larger data fields are being transferred. The value of this further marker is also ascertained in the bus subscribers, and as a function thereof and/or of the content of the data length code, the receiving process is adapted to the size of the CRC field.

It is particularly advantageous if, at the beginning of a message according to the present invention, the calculation of at least two CRC checksums using different generator polynomials is started concurrently, and only when it is established which CRC check method is to be used for transfer of the message is a decision made as to which result from one of the concurrently started CRC calculations is used.

The method is advantageously used during normal operation of a motor vehicle in order to transfer data between at least two control units of the motor vehicle that are connected via a suitable data bus. It is usable with equal advantage, however, during production or maintenance of a motor vehicle in order to transfer data between a programming unit connected to a suitable data bus for programming purposes and at least one control unit of the motor vehicle which is connected to the data bus.

A further advantage is that a standard CAN controller requires only minimal modification in order to be able to work according to the present invention. A communication controller according to the present invention that can also operate as a standard CAN controller is only insignificantly larger than a conventional standard CAN controller. The associated application program does not need to be modified, and that already yields advantages in terms of data transfer speed.

Advantageously, considerable portions of the CAN conformance test (ISO 16845) can be carried over. In an advantageous manifestation, the transfer method according to the present invention can be combined with the extensions of TTCAN (ISO 11898-4).

The invention will be explained below in further detail with reference to the drawings.

BRIEF DESCRIPTION OF THE DRAWINGS

FIG. 2 depicts a variety of possibilities for interpreting the contents of the data length code according to the present invention divergently from the CAN standard ISO 11898-1.

DETAILED DESCRIPTION

Figure 1A:
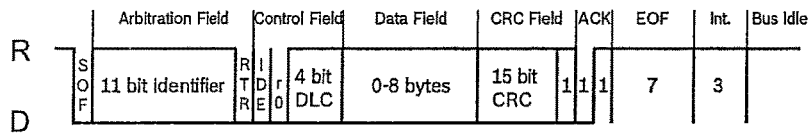
FIG. 1a shows the two alternative for constructing data messages in accordance with the CAN standard ISO 11898-1: CAN Standard Format and CAN Extended Format.
Figure 1A:
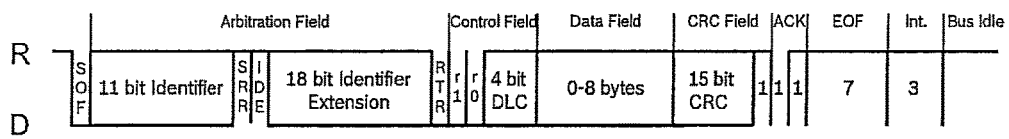

FIG. 1a depicts the construction of messages such as the ones used for data transfer on a CAN bus. The two different formats, "standard" and "extended," are depicted. The method according to the present invention is applicable, in suitable embodiments, to both formats.

The message begins with a "start of frame" (SOF) bit that signals the beginning of the message. This is followed by a segment which serves chiefly to identify the message, and on the basis of which the subscriber of the bus system decides whether or not to receive the message. This segment is labeled "arbitration field" and contains the identifier. It is followed by a "control field" that contains, inter alia, the data length code. The data length code contains information regarding the size of the data field of the message. Following this is the actual "data field," which contains the data to be exchanged between the bus system subscribers. This is followed by the "CRC field" having the 15-bit checksum and a delimiter, and then by two "acknowledge" (ACK) bits which serve to signal to the sender that a message has successfully been received. The message is terminated by an "end of frame" (EOF) sequence.

In the CAN transfer method according to the standard, the data field is allowed to contain a maximum of 8 bytes, i.e. 64 bits, of data. According to the standard the data length code encompasses four bits, i.e. can assume 16 different values. In present-day bus systems, only eight different values from this value range are used for the different sizes of the data field, from 1 byte to 8 bytes. A data field of 0 bytes is not recommended in the CAN standard; sizes above 8 bytes are not permissible. The association between the data length code values and the sizes of the data field is depicted in FIG. 2 in the "Norm CAN" column.

Figure 1B:
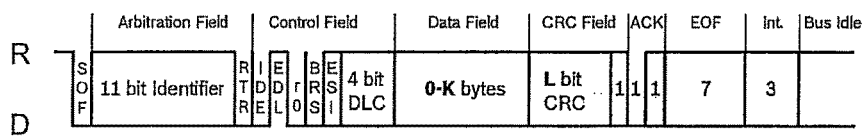
FIG. 1b shows two examples of the format of "CAN FD long" messages modified with respect thereto according to the present invention, having a modified control field and a flexible size for the data field and the CRC field. Both a modification of a standard CAN message and a modification of an extended CAN message are depicted.
Figure 1B:
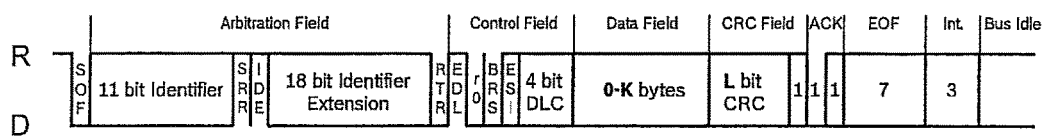

FIG. 1b, in an analogous depiction, compares the modified messages to be transferred according to the present invention, derived respectively from the two standard formats. They differ from the standard-compliant messages of FIG. 1a by being supplemented with some additional bits in the control field, which are labeled EDL, BRS, ESI, and whose purpose will be explained below. The messages according to the present invention furthermore differ in terms of the variable size of the data field and CRC field. The messages are therefore labeled "CAN FD Long."

In the transfer method modified according to the present invention, the data field can also contain more than 8 bytes, specifically (in the manifestation depicted) up to K bytes. Unlike in standard CAN, further values that the data length code can assume are utilized in order to identify larger data fields. For example, the four bits of the data length code can be used to represent the values from zero to 15 bytes. Other allocations can, however, also be made; one possibility, for example, is to use the value of the data length code DLC=0b0000 (not usually used in present-day CAN messages) for a further possible size of the data field, for example for the 16-byte size.

These two possibilities are depicted in table form in FIG. 2 as DLC 1 and DLC 2. In these cases the maximum size of the data field K has the value 15 and 16, respectively. A further possibility is that for values of the data length code greater than 0b1000 and up to 0b1111, the pertinent sizes of the data field increase by a greater increment. An example for this instance is depicted in the table as DLC 3. In this variant, the maximum size of the data field K reaches the value of 64 Bytes. A different choice is of course possible, for example an increment of 4 bytes in each case.

In order to ensure that a communication controller according to the present invention can ascertain the manner in which it needs to interpret the contents of the data length code, it is advantageous for it to detect independently whether communication on the bus system is proceeding according to standard CAN or the method according to the present invention. One possibility for this is to utilize for marking a bit within the arbitration field or the control field which is always transferred with a fixed value in standard CAN, so that from this first marker the communication controller can derive a first switchover condition on the basis of which it selects the transfer method to be used.

Marking with Standard Addressing:

In the standard format as depicted in the top part of FIG. 1a, the second bit of the control field of standard CAN data messages is always transmitted dominantly and labeled r0. In the example, depicted in the top part of FIG. 1b, of a message according to the present invention with standard addressing (i.e. having an arbitration field according to the standard CAN format), this second bit of the control field is used for marking by being transmitted recessively. A recessive value of the second bit of the control field in a message of this kind thus indicates that the message format divergent from the standard will subsequently be transferred. This recessively transferred second bit of the control field of a message having a standard arbitration field is labeled EDL (extended data length). The bit r0 that is always transferred dominantly in standard CAN is replaced in the messages according to the present invention by the recessive EDL bit or, in the messages according to the present invention, it shifts back one position to the location between the recessive EDL bit and the BRS bit that is likewise recessive upon switchover of the bit length. In addition, further bits can also be inserted into the control field. FIG. 1b depicts, for example, a bit called ESI that will discussed in further detail later on. Two or more bits could also be inserted at this point without influencing the method according to the present invention.

In all, therefore, the bit sequence in the control field of standard CAN messages:

{IDE, r0, DLC3, DLC2, DLC1, DLC0} is replaced in messages according to the present invention by:

{IDE, EDL, N additional bits, DLC3, DLC2, DLC1, DLC0}.

In the example depicted in FIG. 1b, N=3 with the inserted bits r0, RBS, ESI. N could also, however, assume any other values greater than zero.

For reasons that will be explained later, the BRS bit should (if applicable) be inserted after a bit that is always transferred dominantly, for example in combination with and directly after the r0 bit.

Marking with Extended Addressing:

As depicted in the bottom part of FIG. 1a, in extended format the first two bits of the control field of standard CAN data messages are always transmitted dominantly and are labeled r1 and r0. In the example, depicted in the bottom part of FIG. 1b, of a message according to the present invention with extended addressing (i.e. having an arbitration field in accordance with the extended CAN format), the first bit r1 of the control field is used for marking, by the fact that it is transmitted recessively. A recessive value of the first bit of the control field in such a message indicates, in this case, that the message format divergent from the standard will subsequently be transferred. Here as well, this recessively transferred bit of the control field is labeled EDL (extended data length). It replaces the reserved dominant r1 bit of standard CAN messages with extended format. Alternatively, the dominant r1 bit could also be retained and could shift one position back, so that the EDL bit would be inserted as an additional bit between RTR and r1. It would likewise be possible to insert the EDL bit (recessively) as an additional bit between r1 (dominant) and r0 (dominant). In this case as well, further bits can then also be inserted in the control field. FIG. 1b, for example, once again depicts the bit called ESI that is yet to be discussed. Two or more bits could also be inserted without influencing the method according to the present invention. In all, therefore, the bit sequence in the control field of extended standard CAN messages:

{r1, r0, DLC3, DLC2, DLC1, DLC0} is replaced in messages according to the present invention by

{EDL, N additional bits, DLC3, DLC2, DLC1, DLC0} or
{r1, EDL, M additional bits, DLC3, DLC2, DLC1, DLC0}.

The example depicted in FIG. 1b shows the former example with N=3, i.e. with the inserted bits r0, RBS, ESI. N and M respectively could also, however, assume any other values greater than zero. Here as well, for reasons that will be explained later, the BRS bit should if applicable be inserted after a bit that is always transferred dominantly, for example in combination with and directly after the r0 bit.

Alternatively, it is also possible to utilize the method in suitable communication controllers that are not also configured for standard-compliant CAN communication. In this case the definition of the aforesaid first switchover condition, for example as a function of a suitable marker of the message, can also be omitted. In this case the communication controllers instead work exclusively in accordance with one of the methods described, and are accordingly usable only in bus systems in which exclusively communication controllers of this kind according to the present invention are in use.

If the data field of messages is enlarged as provided in the invention, it can also be useful if the method that is used is adapted to the cyclic redundancy check (CRC) in order to obtain sufficient fault tolerance. It can be advantageous in particular to use a different, for example a higher-order CRC polynomial and correspondingly to provide a CRC of a divergent size in the messages modified according to the present invention. This is depicted in FIG. 1b by the fact that in the example depicted, the CRC field of the messages according to the present invention has a length of L bits, where L, divergently from standard CAN, can be not equal to and in particular greater than 15.

The use of a modified method for calculating the CRC checksum can be signaled to the bus subscribers by a further marker that represents a further switchover condition. In an exemplary embodiment, this further marker can match the first marker and/or switchover condition.

In standard CAN controllers, the CRC code of CAN messages to be sent is generated by a fed-back shift register into whose input the serially transmitted bits of the message are sequentially injected. The width of the shift register corresponds to the order of the CRC polynomial. CRC coding is accomplished by combining the register content with the CRC polynomial during the shift operations. When CAN messages are received, the serially received bits of the message are correspondingly shifted into the CRC shift register. The CRC test is successful if, at the end of the CRC field, all the bits of the shift register are zero. CRC code generation upon transmission, and the CRC test upon reception, both occur in hardware without requiring a software intervention. A modification of CRC coding thus has no effect on the application software.

In a particularly advantageous embodiment, the communication controller is configured so that it exhibits compatibility with standard CAN, i.e. operates in standard-compliant fashion in a standard CAN bus system, while in a bus system modified according to the present invention it on the one hand permits larger data fields in the messages and on the other hand also carries out adapted calculation and checking of the CRC code.

Because it is not yet established, when reception of a message begins, whether a standard-compliant CAN message or a message modified according to the present invention is being received, two CRC shift registers that operate concurrently are implemented in a communication controller according to the present invention. After reception of the CRC delimiter, when the CRC code is evaluated in the receiver, the further marker according to the present invention establishes which transfer method was used, and the shift register associated with that transfer method is then evaluated. As already presented earlier, the further marker can match the first marker that relates to the size of the data field and to the interpretation of the data length code.

When transmission of a message begins, the transfer method that is to be used for transmission is already established for the transmitter. But because it can happen that arbitration for bus access can be lost, and that the message that was begun is not sent but instead a different message is received, here as well control is applied concurrently to both CRC shift registers.

The above-described implementation of two concurrently operating CRC shift registers also enables a further improvement:

The CRC polynomial of the standard CAN protocol ($x^{15}+x^{14}+x^{10}+x^8+x^7+x^4+x^3+1$) is configured for a message length of less than 127 bits. If messages transferred according to the present invention use even longer data fields, it is useful to use a different, in particular longer CRC polynomial in order to maintain transfer reliability. The messages transmitted according to the present invention accordingly receive a modified, in particular longer CRC field. During operation, the communication controller switches dynamically between the two CRC shift registers, i.e. between the standard CAN-compliant shift register and the one according to the present invention, in order to use the respectively appropriate polynomial.

Of course more than two shift registers, and correspondingly more than two CRC polynomials, can also be utilized in graduated fashion as a function of the length of the data field or depending on the desired transfer reliability. In this case, if compatibility with standard CAN is to be retained, the corresponding marker and the switchover condition associated therewith must be adapted. For example, the second bit of the control field could represent a first marker that identifies a switchover to longer data fields, for example in accordance with DLC 1 in FIG. 1, and an associated second CRC polynomial. For messages that contain longer data fields and are identified by the first marker, it is possible for example to insert into the control field an additional bit that identifies the switchover to a further set of data field sizes, for example DLC 3 of FIG. 2, and a third CRC polynomial. The insertion of additional bits into the control field of messages that exhibit the first marker is possible because a modified transmission and reception process is in any case being utilized here in the communication controller, and such changes can thus be taken into account. Compatibility with standard CAN is provided by the fact that when the first marker is not present, i.e. when the second bit of the control field is dominant in the example shown, the construction of the messages exactly conforms to the specifications of ISO standard 11898-1.

Figure 3:
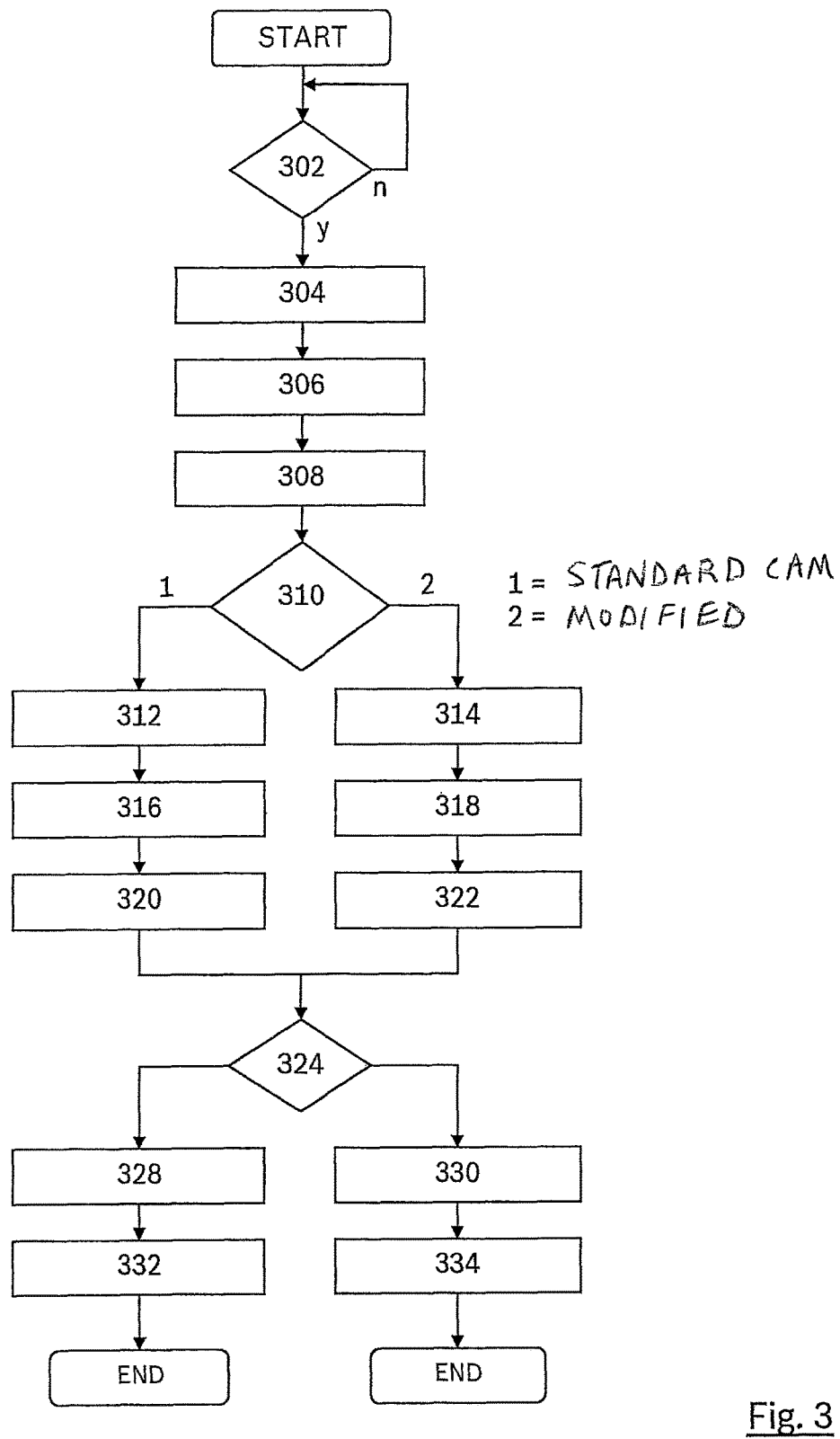
FIG. 3 schematically depicts an exemplifying embodiment of the receiving process at a subscriber station of the "CAN FD long" type on the bus system.

FIG. 3 is a simplified depiction of a portion of the receiving process according to the present invention that executes on a subscriber station of the bus system. The case illustrated here is that in which compatibility with standard CAN is achieved by the fact that the behavior of the communication controller is adapted as a function of the first switchover condition. Although a depiction usual for describing program sequences in software was selected in FIG. 3, the method is entirely suitable for implementation in hardware.

The subscriber stations are initially in a state that scans the bus, as long as no communication traffic exists on the bus. The query 302 therefore waits for a dominant bit on the bus. This bit identifies the beginning of a new message (start of frame).

As soon as the beginning of a new message has been established, calculation of the at least two checksums to be calculated concurrently begins in block 304. The first checksum corresponds to CRC calculation according to standard CAN, while the second checksum is calculated according to the novel method.

Starting at step 306 the further bits of the message following the SOF bits are then received, starting with the arbitration field. If multiple bus subscribers want to send a message, negotiation occurs among the bus subscribers, according to the method usual in standard CAN, as to which bus subscriber obtains access to the bus. The block 306 that is depicted identifies reception of all bits until the first marker has been received or the first switchover condition is established. In the example depicted, the first switchover condition is ascertained from the control field, for example from the second bit thereof (see FIG. 1). Fin block 308, further bits of the message can then also be received until, starting at a specific bit of the message, the procedure becomes different as a function of the first switchover condition that is established. This division into different procedures is ensured by a corresponding query or branching point 310, as explained below by way of example.

If what is present at the branching point 310, for example after reception of the second bit of the control field as a dominant r0 bit, is the information that, in accordance with the first marker, communication is occurring according to standard CAN (path labeled "1" in FIG. 3), then in step 312 the further bits of the control field are read in. Based on those bits, the data length code is evaluated in accordance with standard CAN, and in step 316 the associated volume of data (8 bytes maximum, corresponding to the data field) is then received. The CRC field, encompassing 15 bits, is then received in step 320. If what is present at the branching point 324 is the information that the CRC checksum transmitted by the sender and the one ascertained by the receiver itself match one another, a dominant acknowledge bit is sent in block 328. Care must be taken that in this case the standard-compliant CRC checksum is compared, since communication is occurring according to standard CAN. If a match is not established, then the acknowledge bit is transmitted recessively (block 330). The ACK delimiter and the EOF bits then follow in steps 332 and 334, respectively. This completes one reception process for one message.

If, on the other hand, what is present at the branching point 310, for example after reception of the second bit of the control field as a recessive EDL bit, is the information that the communication method modified according to the present invention is to be utilized (path labeled "2" in FIG. 3), then in block 314 the further bits of the control field are read in. It is also possible here, for example, to read in additional bits added in the control field, which bits can serve, for example, for switchover to a further divergent CRC polynomial or also for bit length switchover, for synchronization, or for further purposes. This aspect will be further discussed in more detail. From the result, the data length code is ascertained according to the new interpretation, for which some examples are set forth in table form in FIG. 2. In block 318 the corresponding volume of data, i.e. for the DLC 1 example from the table in FIG. 2 up to 15 bytes, for the DLC 2 example up to 16 bytes, and for the DLC 3 example up to 64 bytes of data, are received. In block 322 the CRC field that diverges according to the present invention, in particular is longer, is received. If what is present at the branching point 324 is the information that the CRC checksum transmitted by the sender and the one ascertained by the receiver itself match one another (the comparison being based in this case on the CRC checksum that diverges according to the present invention), then in block 328 a dominant acknowledge bit is sent. Otherwise the acknowledge bit is sent recessively (block 330). The ACK delimiter and EOF bits then follow in steps 332 and 334 respectively. This completes one reception process for one message.

FIG. 3 has illustrated the case in which the further marker, which determines the CRC to be used, matches the first marker, which relates to the size of the data field and to the interpretation of the data length code. There was therefore no further query, prior to the respective reception 320 and 322 of the CRC checksums, as to which CRC is to be received in accordance with the further marker and evaluated for the branching point 324. This additional query can be incorporated, as applicable, into the sequence by a simple modification of the flow chart of FIG. 3.

Figure 4:
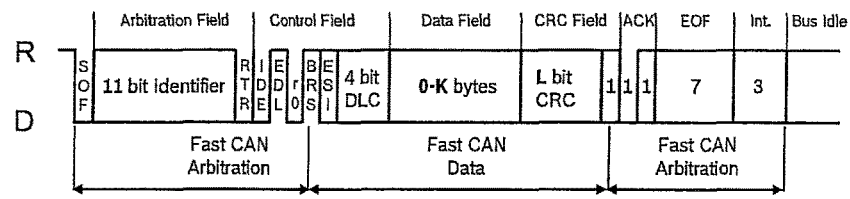
FIG. 4 shows two further examples of messages, modified according to the present invention, of the "CAN FD fast" type in which, as compared with FIG. 1b, regions in which a different bit length is used according to the present invention are additionally defined within the message.
Figure 4:
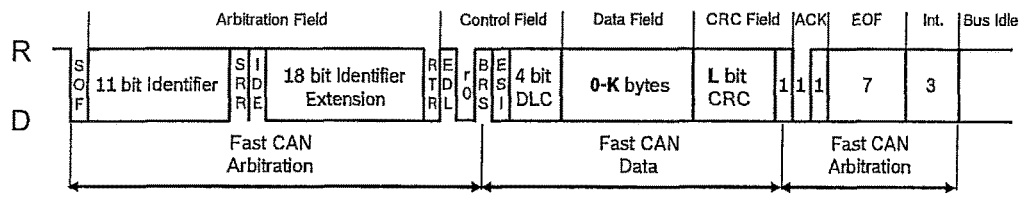

FIG. 4 shows two further examples of messages modified according to the present invention in which regions in addition to those of FIG. 1b are defined within the message, in which regions, according to the present invention, a different bit length is used and the individual bits are thus transferred more quickly via the bus. The messages are therefore labeled "CAN FD Fast." For the two possible addressing variants of messages (Standard Format and Extended Format), regions are plotted in FIG. 4 in which a switchover can occur between two states, labeled "Fast CAN Arbitration" and "Fast CAN Data." The result of this switchover between the two states is that for the corresponding part of the message, the bit lengths are shortened and thus the individual bits are transferred more quickly via the bus. The transfer time for a message can thus be shortened as compared with the standard-compliant method. The associated change in time-related bit length can be implemented, for example, by using at least two different scaling factors to adjust the bus time unit during operation relative to a shortest time unit or to the oscillator clock. The switchover of bit length, as well as the corresponding change in the scaling factor, are likewise depicted by way of example in FIG. 4.

The transition between the Fast CAN Arbitration and Fast CAN Data states occurs in message that exhibit the first marker (EDL), as a function of a second marker that signals to the data transfer subscribers that the shortened bit length is being used. In the exemplifying embodiment depicted here, the position of this marker is an additional bit in the control field that is labeled BRS (bit rate switch). In the example shown, it is transferred as a fourth bit of the control field.

In the case depicted, i.e. in which the first marker EDL is followed by the second marker BRS, the messages transferred in the transfer method according to the present invention are ones whose bit length is appreciably shortened, whose data field size can be expanded to values above 8 bytes, and whose CRC is adapted to the larger data field. A substantial increase in transfer capacity via the bus system is thereby achieved, simultaneously with improved transfer reliability.

In the example depicted, the faster transfer begins immediately after transmission of the associated marker and ends directly after the bit defined for switching back is reached, or when a reason for starting an error frame has been detected.

Figure 5:
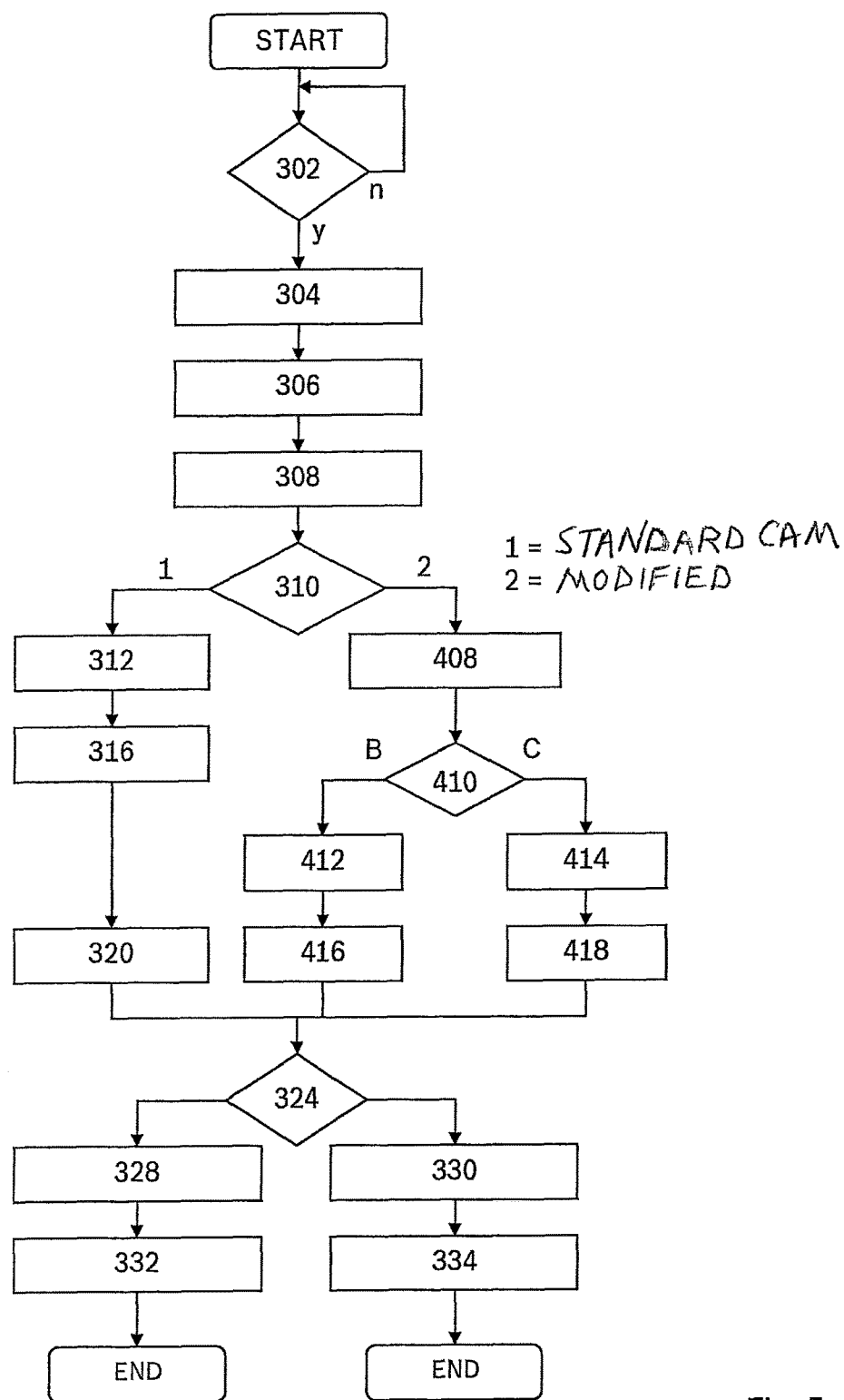
FIG. 5 schematically depicts an exemplifying embodiment of the receiving process according to the present invention at a subscriber station of the "CAN FD fast" type on the bus system.

FIG. 5 shows a receiving process modified with respect to FIG. 3, in which process a switchover additionally occurs between the Fast CAN Arbitration and Fast CAN Data states as a function of the second marker BRS. If what is present at the branching point 310, for example after reception of the second bit of the control field as a recessive EDL bit, is the information that the communication method modified according to the present invention is to be used, then in block 408 the next bit of the control field is read in. If the bit serving as the second marker, for example the fourth bit BRS of the control field extended according to the present invention, is received with the stipulated value, for example recessively, then the Fast CAN Data state is assumed, for example, at the sample point of that bit, i.e. a switchover occurs to the shortened bit length (path "C"). If the relevant bit has the opposite value, i.e. in this example is dominant, then no shortening of the bit length occurs (path "B"). In blocks 412 and 414 respectively, reception of the remaining bits of the control field (including the data length code) occurs, along with reception of the data field in accordance with the size information from the data length code. Reception occurs with normal bit length in block 412, and with shortened bit length in block 414. The CRC field that diverges according to the present invention, in particular is longer, is read in blocks 416 and 418, respectively. At the last bit of the CRC field (the CRC delimiter), in block 418 execution switches back into the Fast CAN Arbitration state with a usual bit rate. Then, at branching point 324, a check is made analogously to FIG. 3 as to whether the CRC checksum transmitted by the sender and the one ascertained by the receiver itself match one another; and the process continues as a function thereof as already indicated in FIG. 3.

The r0 bit (or possibly r1 in the context of extended addressing) that follows the recessive bit of the first marker EDL in the messages according to the present invention, and is always dominant, results (as may be gathered, for example, from FIGS. 1b and 4) in a recessive-dominant edge in all data messages according to the present invention. This edge can be employed to improve synchronization between the bus subscribers, which is advantageous in particular for the switchover to shorter bit lengths that is provided for.

When all the subscribers in the network are synchronized with the transmitting subscriber, the switchover to the shorter bit length can occur without difficulty. It may also happen, however, that at the bit provided for the switchover, the bus subscribers are not all synchronized with the transmitting subscriber, for example if a first transmitting subscriber transmits the "dominant-dominant" bit sequence at the end of the arbitration field and a second transmitting subscriber, which still wishes to gain access to the bus in the context of arbitration, transmits the "dominant-recessive" bit sequence. The second transmitting subscriber loses the arbitration at the recessive bit and becomes the receiver. Until the recessive bit, the two transmitters had sent the same bit sequence. Because the two transmitters, as a result of transit times over the CAN bus and the transceivers, see their own respectively transmitted recessive-to-dominant edges earlier than they see those transmitted by the respective other transmitter, neither one has synchronized with the other.

If the bit length has been switched over before the bus subscriber that has just become a receiver has synchronized with the remaining transmitter, synchronization then occurs after switchover, in the shorter-bit-length region. The phase shift resulting from the synchronization is then greater relative to the bit length. Depending on the signal transit time between the two bus subscribers, the phase shift can become so large that mis-synchronization occurs, and a bit is incorrectly sampled. The receiver will then not recognize the received message as valid, and will destroy it with an error frame.

This problem does not occur in standard CAN communication, since there the propagation segment of the CAN bit timing compensates for the phase shifts between the bus subscribers caused by signal transit times. In the configuration for a shorter bit length, however, the propagation segment can be minimized or entirely omitted in order to shorten the bit length.

In order to avoid mis-synchronization after the bit length switchover, synchronization prior to the bit length switchover must be guaranteed by way of suitable actions. This can be achieved by carrying out a synchronization at the edge from EDL (recessive) to r0 or r1 (dominant). In particular, a hard synchronization can be carried out instead of the resynchronization that is otherwise usual within a frame. This is also carried out, for example, at the start of frame bit, and reliably and completely compensates for possible phase shifts. In the case of a resynchronization that is otherwise usual within a frame, a residual error can remain if the phase error is greater than the configured resynchronization jump width (SJW).

As a variant of the method presented, the switchover to shortened bit lengths can additionally be coupled, as a function of the value of the second marker BRS, to the dominant value of the previously transferred r0 bit, so that a switchover to the shorter bit length occurs only if r0 was transmitted dominantly. This extension of the method allows a bit sequence in which the recessive EDL bit is followed by a recessive bit instead of the dominant r0 bit to be used for future, additional message formats, for example for a bit coding that diverges from the standard in sub-regions of the message.

The possibility of inserting additional bits in the control field of the messages according to the present invention can furthermore be used to facilitate the recognition of bus subscribers that are in the "error passive" state. A bus subscriber having a communication controller of the existing art assumes the error passive state when the transmit error count or receive error count is 128 or higher. When the bus subscriber is in the error passive state, it is then not permitted to send "active error" flags (six successive dominant bits). If the bus subscriber detects an error, it sends a "passive error" flag (six successive recessive bits). A passive error flag is, however, not distinguishable on the CAN bus from the idle level. In some circumstances, therefore, other bus subscribers can detect only indirectly that a bus subscriber is in the error passive state.

The advantage of the method proposed here, in contrast, is that with this method, bus subscribers that are in the error passive state can be unequivocally identified by the other bus subscribers. This has not hitherto been possible by way of reception of a passive error flag. In bus subscribers of the existing art, the error passive state can be recognized only by the microprocessor locally connected to the CAN controller and, for example, communicated to the other bus subscribers by way of a corresponding status message. Thanks to the novel method, it is not necessary for the microprocessor to send a status message. In addition, in this case the information regarding the error passive state is current at the moment of transmission, whereas in the case of transmission of a status message, the status may have changed between creation of the status message by the microprocessor and the moment of transmission.

In the method described here, the information regarding the error passive state of a communication controller is integrated into the bulletins sent in any case by the bus subscriber. For this purpose, the control field of the message is extended to include a further bit (ESI). As depicted in FIG. 1b, this bit is inserted after the first marker (EDL) and before the DLC, for example directly before or directly after the BRS bit. A bus subscriber that is in the error passive state sends this bit, for example, dominantly, while otherwise the bit is sent recessively. A reverse logic is likewise possible.

The data transfer method that has been presented is suitable for transferring data, during normal operation of a motor vehicle, between at least two control units of the motor vehicle that are connected via a suitable data bus. It is usable with equal advantage, however, during production or maintenance of a motor vehicle in order to transfer data between a programming unit connected for programming purposes to a suitable data bus and at least one control unit of the motor vehicle which is connected to the data bus.

In summary, the method represents a transfer method which is notable for the fact that a standard CAN controller requires only minimal modification in order to be able to operate according to the present invention. A communication controller according to the present invention, which can also work as a standard CAN controller, is only insignificantly larger than a conventional standard CAN controller. The pertinent application program does not need to be modified, and that already yields advantages in terms of data transfer speed. The data transfer speed can be further increased thanks to the use of the expanded size of the data field and of the associated DLC and CRC; the adaptations to the application software are minimal. Large portions of the CAN conformance test (ISO 16845) can be carried over. It is also possible to combine the transfer method according to the present invention with the extensions of TTCAN (ISO 11898-4).

What is claimed is:

1. A method for serial data transfer in a bus system having at least two bus subscribers that exchange messages via the bus, the method comprising:
exchanging messages via the bus, transmitted ones of the messages having a logical structure in accordance with the CAN standard ISO 11898-1, the logical structure encompassing a start of frame bit, an arbitration field, a control field, a data field, a CRC field, an acknowledge field, and an end of frame sequence, the control field encompassing a data length code that contains an information item regarding the length of the data field;
providing, when a first marker (EDL) is present, that the control field of the messages, divergently from the CAN standard ISO 11898-1, encompasses more than six bits;
implementing the first marker (EDL) by a recessive bit in the control field; and
providing that, when the first marker is present, the recessive bit of the first marker (EDL) is followed, in all data messages, by at least one dominant bit.

2. The method of claim 1, wherein a recessive-dominant edge that is produced by the dominant bit following the recessive bit of the first marker (EDL) in all data messages is utilized to improve synchronization between the bus subscribers.

3. The method of claim 1, wherein a hard synchronization is carried out by the bus subscribers at a recessive-dominant edge that is produced by the dominant bit following the recessive bit of the first marker (EDL) in all data messages.

4. The method of claim 1, wherein when the first marker (EDL) is present, the data field of the messages, divergently from the CAN standard ISO 11898-1, can encompass more than eight bytes, values of four bits of the data length code being interpreted at least in part divergently from the CAN standard ISO 11898-1 to establish a size of the data field.

5. The method of claim 1, wherein when a second marker (BRS) is present, a bit length for at least one predefined or predefinable region within the messages assumes a value that is shortened with respect to the bit length used before the second marker was present, the region beginning at the earliest with the second marker and ending at the latest with a CRC delimiter, the second marker (BRS) occurring only when the first marker (EDL) is present, and occurring in the control field of the messages which, divergently from the CAN standard ISO 11898-1, encompasses more than six bits.

6. The method of claim 5, wherein the second marker (BRS) is implemented by another recessive bit in the control field which is transferred later in time than the bit of the first marker (EDL).

7. The method of claim 6, wherein when the second marker is present, the recessive bit of the second marker (BRS) is separated from the recessive bit of the first marker (EDL) by at least one dominant bit.

8. The method of claim 1, wherein the first marker (EDL) is evaluated in the bus subscribers and, as a function of the first marker, a receiving process is adapted to a size of the control field and/or of the data field and/or of subsequent constituents of the messages.

9. The method of claim 5, wherein the second marker (BRS) is evaluated in the bus subscribers when the first marker is present, and as a function of the value of the second marker, a receiving process is adapted to different values of the bit length within a message.

10. The method of claim 5, wherein at least two different values of a time-related bit length within a message are realized by using at least two different scaling factors to adjust a bus time unit during operation relative to a shortest time unit or to an oscillator clock.

11. The method of claim 1, wherein when a further marker is present, the CRC field of the messages has a number of bits divergent from the CAN standard ISO 11898-1, and/or at least one generator polynomial divergent from the CAN standard ISO 11898-1 is used, where the further marker can match the first marker (EDL).

12. The method of claim 11, wherein a value of the further marker is ascertained in the bus subscribers, and a receiving process is adapted to a size of the CRC field depending on the value of the further marker and/or on content of the data length code.

13. The method of claim 11, wherein at a beginning of a message, calculation of at least two CRC checksums using different generator polynomials is started concurrently, and as a function of a value of the further marker, a decision is made as to which result from one of the concurrently started CRC calculations is used.

14. An apparatus for serial data transfer in a bus system having at least two bus subscribers that exchange messages via the bus, comprising:

an exchange arrangement to exchange messages via the bus, transmitted ones of the messages having a logical structure in accordance with the CAN standard ISO 11898-1, the logical structure encompassing a start of frame bit, an arbitration field, a control field, a data field, a CRC field, an acknowledge field, and an end of frame sequence, the control field encompassing a data length code that contains an information item regarding the length of the data field;

a control arrangement to provide, when a first marker (EDL) is present, that the control field of the messages, divergently from the CAN standard ISO 11898-1, encompasses more than six bits, to implement the first marker (EDL) by a recessive bit in the control field, and to provide that, when the first marker is present, the recessive bit of the first marker (EDL) is followed, in all data messages, by at least one dominant bit.

15. The apparatus of claim 14, wherein a recessive-dominant edge that is produced by the dominant bit following the recessive bit of the first marker (EDL) in all data messages is utilized in the apparatus to improve synchronization between the bus sub scribers.

16. The apparatus of claim 14, wherein a hard synchronization of the bus subscribers is carried out by the apparatus at a recessive-dominant edge that is produced by the dominant bit following the recessive bit of the first marker (EDL) in all data messages.

17. The apparatus of claim 14, wherein when the first marker (EDL) is present, the data field of the messages, divergently from the CAN standard ISO 11898-1, can encompass more than eight bytes, values of four bits of the data length code being interpreted at least in part divergently from the CAN standard ISO 11898-1 in order to establish a size of the data field.

18. The apparatus of claim 14, wherein when a second marker (BRS) is present, a bit length for at least one predefined or predefinable region within the messages assumes a value that is shortened with respect to the bit length used before the second marker was present, the region beginning at the earliest with the second marker and ending at the latest with a CRC delimiter, the second marker (BRS) occurring only when the first marker (EDL) is present, and occurring in the control field of the messages which, divergently from the CAN standard ISO 11898-1, encompasses more than six bits.

19. The apparatus of claim 14, wherein a second marker (BRS) is implemented by another recessive bit in the control field which is transferred later in time than the bit of the first marker (EDL).

20. A method for serial data transfer, during normal operation of a motor vehicle to transfer data between at least two control units of the motor vehicle that are connected via a data bus in a bus system having at least two bus subscribers that exchange messages via the bus, the method comprising:

exchanging messages via the bus, transmitted ones of the messages having a logical structure in accordance with the CAN standard ISO 11898-1, the logical structure encompassing a start of frame bit, an arbitration field, a control field, a data field, a CRC field, an acknowledge field, and an end of frame sequence, the control field encompassing a data length code that contains an information item regarding the length of the data field;

providing, when a first marker (EDL) is present, that the control field of the messages, divergently from the CAN standard ISO 11898-1, encompasses more than six bits;

implementing the first marker (EDL) by a recessive bit in the control field; and providing that, when the first marker is present, the recessive bit of the first marker (EDL) is followed, in all data messages, by at least one dominant bit.

21. A method for serial data transfer, during production or maintenance of a motor vehicle to transfer data between a programming unit connected to a suitable data bus for programming purposes and at least one control unit of the motor vehicle which is connected to the data bus in a bus system having at least two bus subscribers that exchange messages via the bus, the method comprising:

exchanging messages via the bus, transmitted ones of the messages having a logical structure in accordance with the CAN standard ISO 11898-1, the logical structure encompassing a start of frame bit, an arbitration field, a control field, a data field, a CRC field, an acknowledge field, and an end of frame sequence, the control field encompassing a data length code that contains an information item regarding the length of the data field;

providing, when a first marker (EDL) is present, that the control field of the messages, divergently from the CAN standard ISO 11898-1, encompasses more than six bits;

implementing the first marker (EDL) by a recessive bit in the control field; and providing that, when the first marker is present, the recessive bit of the first marker (EDL) is followed, in all data messages, by at least one dominant bit.

\* \* \* \* \*